United States Patent
Wilson et al.

(10) Patent No.: US 10,318,413 B1
(45) Date of Patent: Jun. 11, 2019

(54) SCALABLE ENTERPRISE PLATFORM FOR AUTOMATED FUNCTIONAL AND INTEGRATION REGRESSION TESTING

(71) Applicant: JPMorgan Chase Bank, N.A., New York, NY (US)

(72) Inventors: Mark R. Wilson, Hampshire (GB); Nicholas Johnston, Dorset (GB); Pollawat Poonjiradejma, Bournemouth (GB); Hani E. Sayyed, Bournemouth (GB); Thomas Williams, Poole (GB)

(73) Assignee: JPMorgan Chase Bank, N.A., New York, NY (US)

(*) Notice: Subject to any disclaimer, the term of this patent is extended or adjusted under 35 U.S.C. 154(b) by 128 days.

(21) Appl. No.: 15/660,186

(22) Filed: Jul. 26, 2017

Related U.S. Application Data

(60) Provisional application No. 62/366,705, filed on Jul. 26, 2016.

(51) Int. Cl.
*G06F 11/36* (2006.01)
*G06F 9/44* (2018.01)

(52) U.S. Cl.
CPC ...... *G06F 11/3688* (2013.01); *G06F 11/3692* (2013.01)

(58) Field of Classification Search
CPC .......................... G06F 11/3688; G06F 11/3692
USPC ....................................................... 717/124
See application file for complete search history.

(56) References Cited

U.S. PATENT DOCUMENTS

| | | | | |
|---|---|---|---|---|
| 8,438,545 | B1* | 5/2013 | Almog | G06F 11/3692 717/126 |
| 2002/0066077 | A1* | 5/2002 | Leung | G06F 11/368 717/126 |
| 2006/0212540 | A1* | 9/2006 | Chon | G06F 11/261 709/218 |
| 2007/0116267 | A1* | 5/2007 | Speirs, II | H04L 9/06 380/28 |

(Continued)

OTHER PUBLICATIONS

Denney et al., "AdvoCATE: An Assurance Case Automation Toolset"; Springer, 2012, 15pg. (Year: 2012).*

(Continued)

*Primary Examiner* — Ryan D. Coyer
(74) *Attorney, Agent, or Firm* — Calfee, Halter & Griswold LLP

(57) ABSTRACT

A scalable enterprise platform for automated functional and integration regression testing is provided. Embodiments of the disclosed system facilitate the testing of any number of different software systems in development, even where the systems have unique dataset formats. Embodiments of the present invention provide a common method to generate logging and results reports across the platform, thereby providing simpler results analysis. Embodiments may also standardize the query set and facilitate the capability to analyze large results sets. Furthermore, embodiments of the disclosed system may combine the original data to the validated data to allow testers to analyze the testing results. In addition, embodiments of the present invention supports secured separation of testing domains. At least one embodiment, the system includes a centralized user interface system that provides users with different domains to securely access one or more testing domains.

18 Claims, 10 Drawing Sheets

(56) References Cited

U.S. PATENT DOCUMENTS

| | | | | |
|---|---|---|---|---|
| 2008/0120129 A1* | 5/2008 | Seubert | ............... | G06Q 10/06 |
| | | | | 705/35 |
| 2013/0132777 A1* | 5/2013 | Froehlich | ............ | G06F 11/3688 |
| | | | | 714/37 |
| 2014/0181793 A1* | 6/2014 | Kaliappan | ........... | G06F 11/3684 |
| | | | | 717/124 |
| 2017/0039133 A1* | 2/2017 | Rai | ..................... | G06F 11/3688 |

OTHER PUBLICATIONS

Godefroid et al., "DART: Directed Automated Random Testing"; ACM, 2005, 11pg. (Year: 2005).*
Kabbani et al., "Towards an Evaluation Framework for SOA Security Testing Tools"; IEEE, 2010, 6pg. (Year: 2010).*
Zhang et al., "In Unity There is Strength: Showcasing a Unified Big Data Platform with MapReduce Over both Object and File Storage"; IEEE, 2014, 7pg. (Year: 2014).*

* cited by examiner

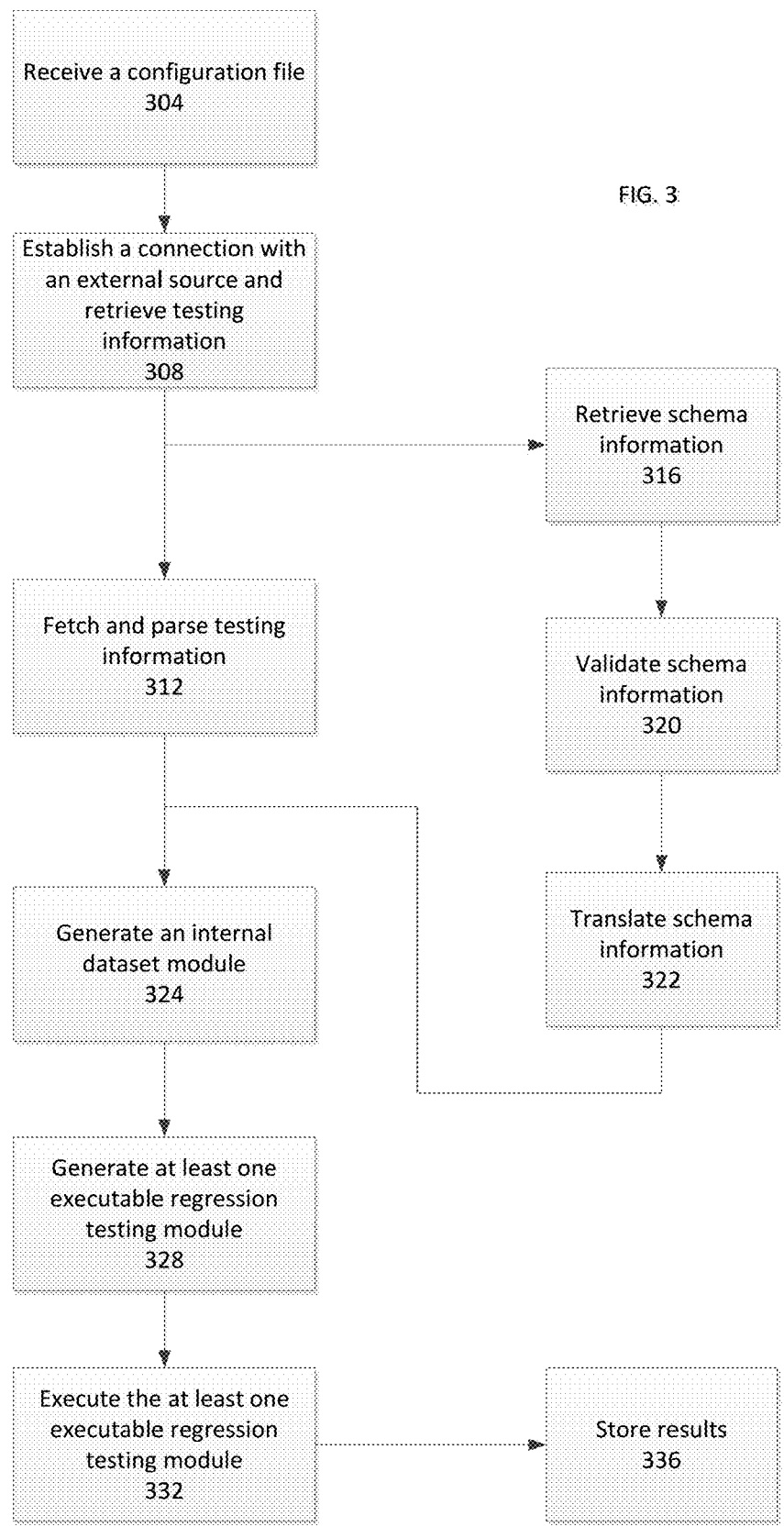

SCALABLE ENTERPRISE PLATFORM FOR AUTOMATED FUNCTIONAL AND INTEGRATION REGRESSION TESTING

PRIORITY

This application claims priority from provisional application Ser. No. 62/366,705 filed on Jul. 26, 2016.

TECHNICAL FIELD

Embodiments of the invention are related generally to systems and methods for software application testing. The present invention relates generally to a system and method for efficiently validating the functionality and performance of software applications using regression testing.

BACKGROUND OF THE INVENTION

Software development in the Internet-era has grown increasingly complex. Software applications must not only handle and process complex calculations and tasks, but must be able to accurately and efficiently process a large variety of data types and data content.

Testing of software applications, as a result, has also become complex and difficult. With modern development methods, it is very difficult to comprehensively test software applications accurately and in a timely fashion within short testing development cycles that are generally available. Members of the testing team must manually build and execute testing phases that include quality assurance deliverable, design assurance, quality assurance design, quality assurance automation and quality assurance execution, each of which involves complex development steps and any of which could be significantly delayed during development. The manual design and execution of each phase of these tests are inefficient and still results in many errors. As many of the software development process software applications handle complex data sets, the short time frame to validate testing results of such data can result in a significant number of issues. Even after tests are designed and executed, it is often difficult to reuse the tests across projects, as tests are often customized for that specific application. As a result, tests are often not reusable and must be redesigned from the ground up where the dataset formats differ. In addition, while many prior art systems support testing functions, they are not extendible, customizable, or support API commands. Due to these limitations, test administrators must manually create, define and administer tests by manually requesting execution of the tests and manually define schemas, data sets, and other options. Furthermore, the test administrator, using these prior art systems, must resolve frequent issues that require manual intervention before next step of software development cycle can proceed. In addition, when new modules, schemas, or other options are introduced to an existing system, prior art solutions may require that the existing modules be rewritten.

In addition to the foregoing, prior art systems do not allow for data and control segregation for different tests. Although data may be stored in separate database or separate portions of a database, the data is still at risk of theft. For example, data and information may be intercepted between user devices and the systems and engines or components of the system. These systems are at risk for by man-in-the-middle attacks. In addition, many prior art systems do not allow for a single instance of the platform to be deployable for a whole enterprise. Furthermore, the prior art does not support the use of secured data communications and storage via private and public keys or authentication. In addition, these prior art systems are at risks for unauthorized access and control of test design and execution and do not allow data and control access to be restricted.

Accordingly, a solution is needed to overcome these and other deficiencies of the prior art.

BRIEF DESCRIPTION OF THE DRAWINGS

The present invention is described in detail below with reference to the attached figures, wherein:

FIG. 3 illustrates a method for performing regression testing in accordance with one embodiment of the present invention;

DETAILED DESCRIPTION OF PREFERRED EMBODIMENTS

Embodiments of the present invention provide a system and method for improved regression testing. Embodiments of the disclosed system facilitate the testing of any number of different software systems in development, even where the systems have unique dataset formats. Embodiments of the present invention provide a common method to generate logging and results reports across the platform, thereby providing simpler results analysis. Embodiments may also standardize the query set and facilitate the capability to analyze large results sets. Furthermore, embodiments of the disclosed system may combine the original data to the validated data to allow testers to analyze the testing results. In addition, embodiments of the present invention support secured separation of testing domains. In at least one embodiment, the system includes a centralized user interface system that provides users with different domains to securely access one or more testing domains. Other features of embodiments of the present invention include: self-building capabilities; multiple log levels; results and data tracking; enablement of archiving procedures; high concurrency with locking maintained in the database, facilitating dynamic parallel streaming; and high compression using line of businesses systems.

Figure 1:
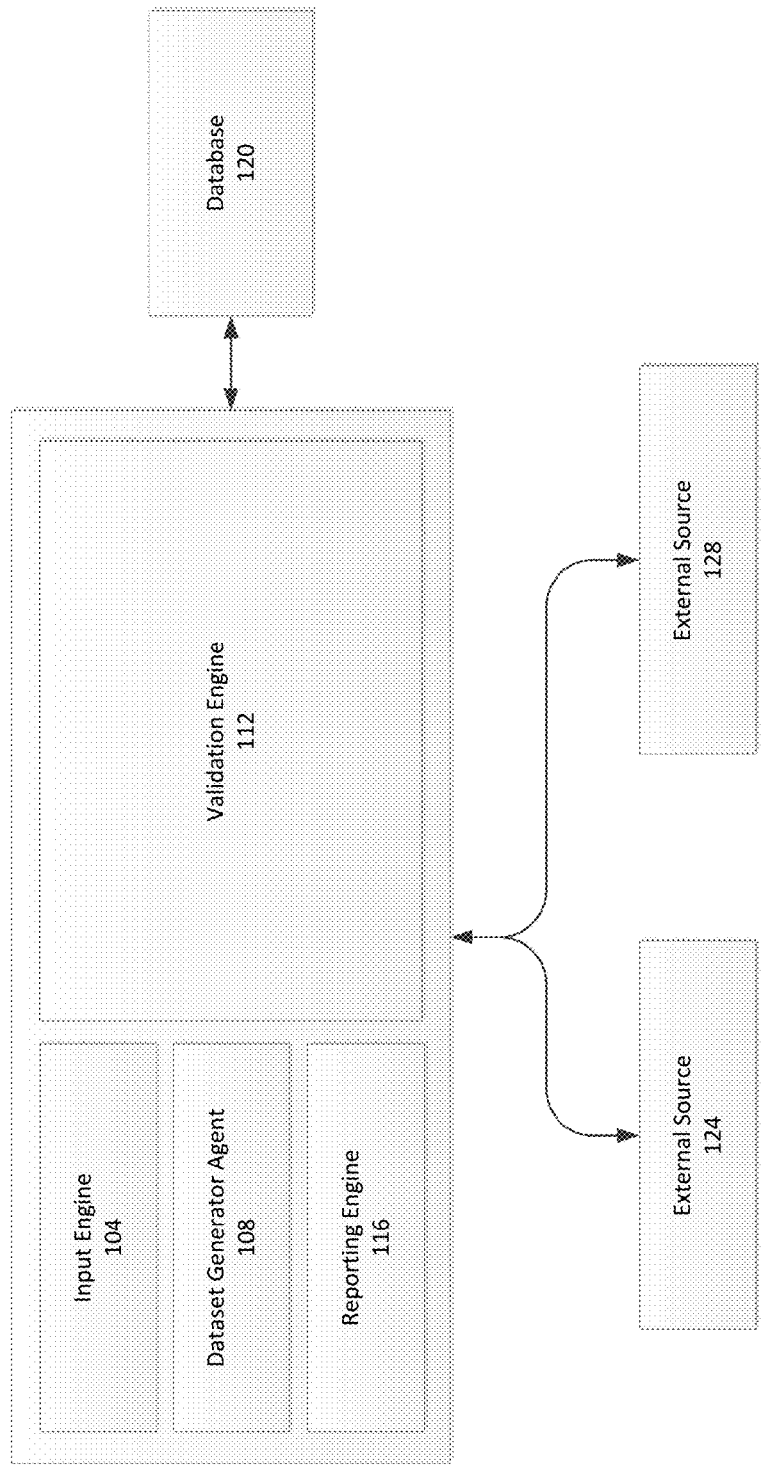
FIG. 1 provides a high-level overview of an embodiment of the presently disclosed regression testing system.

FIG. 1 provides a high-level overview of an embodiment of the presently disclosed scalable enterprise system for automated functional and integration regression testing. The regression testing system 100 includes an input engine 104, a dataset generating engine 108, a validation engine 112, a reporting engine 116, a database 120, and external sources 124 and 128. In other embodiments of the system, including others discussed herein, the regression testing system is also referred to as a testing engine. In at least one embodiment, the system includes a plurality of the above-listed engines that can operate in parallel with one another to test a plurality of datasets supporting different types of databases and/or schemas.

The database input engine 104 receives or retrieves databases of messages for validation. For example, the database input engine 104 may retrieve middleware or T24 databases for use in regression testing.

In one embodiment, the database input engine 104 includes a fetching engine and a parsing engine. The fetching engine may be capable of collecting a message queue from a message queue source, such as the external source 124. The fetching engine may further include a database fetching engine which may retrieve middleware and T24 databases from the external source 124. In one embodiment, the system is capable of mapping database tags. For instance, where the system retrieves a T24 database for parsing and processing, the fetching engine may retrieve a T24 mapping information from the external source 128, thereby allowing the system to parse T24 databases.

Embodiments of the present invention are also capable of handling a plurality of different data types. Embodiments of the present invention may include a parsing engine that is capable of parsing different types of data, including data that rely upon various types of schemas, such as SWIFT, CSV, PSV, JSON, T24, and others known in the art. In one embodiment, the parsing engine may parse the database based on one more schemas or format of the data received at the system 100, as described further below.

Dataset generating engine 108 retrieves data outputted from the database input engine 104 to generate internal datasets. In one embodiment, the dataset generating engine 108 receives a configuration file that identifies the external sources (e.g., external sources 124 and 128) which may be databases and/or message queues, and/or contain other file location information used by the system to prepare for and perform regression testing. Data from external sources may be received via various communication methods, including via File Transfer Protocol (FTP), Server Message Block (SMB), Hypertext Transfer Protocol (HTTP), and others. For instance, the dataset generating engine 108 may receive a configuration file that identifies the location of data (e.g., the message queue, database(s), middleware databases and/ or T24 databases (located at external source 124)); location of the T24 mapping (located at external source 128); and location of the schemas.

Dataset generating engine 108 further receives schemas from an external source (e.g., external source 124 and 128). The dataset generating engine 108 may be capable of validating the schema and converting the schema into an internal common schema. Dataset generating engine 108 may further retrieve the data that has been fetched and parsed by the database input engine 104 and generate a dataset based on the corresponding schema.

In one embodiment, the system further validates received data by validating the format of the data using a mapping database. The mapping database is automatically generated and updated by the system to allow for the validation of data from two or more external sources. The use of the mapping database also allows for the transmission of the mapping database within one or more systems. In addition, in one embodiment, the system processes the mapping database and compiles the content of the mapping database to generate a data validation mapping module for execution by the system. The execution of the data validation mapping module causes a processor to automatically validate the content of the data from two or more external sources.

In one embodiment, the use of the internal common schema allows embodiments of the disclosed system to utilize all or portions of the schema to generate an executable code module. For example, in one embodiment, the dataset generating engine 108 includes a compiler that generates executable regression testing modules based on the schema information and the generated dataset. The compiler may compile the executable regression testing based, not only on the schema information, but also on other information available at or received at the system, including the configuration file. In one further embodiment, each executable regression testing module may be stored in a database and reusable in the future.

Validation engine 112 may select one of a plurality of executable regression testing modules stored at the database for execution. The execution of the selected regression testing module may cause the processor system to validate data from the external source, which may be the message queues and/or database. For example, the validation engine 112 may sequentially, or in parallel fashion, retrieve data from the generated dataset for validation. The data is then sequentially, or in parallel fashion, validated using a regression testing method, as may be dictated by the executable regression testing module.

Results of the validation are stored in at least one database that is internal to the validation system 100 or at an external source. In one embodiment, the validation engine 112 further includes a schema validator which validates schemas received at the regression testing system 100. The system may support, for example, validation of SWIFT-XSD and generic XSD-XML schemas.

The reporting engine 116 generates results of the validation and, in one embodiment, transmits the report to the quality assurance database 120 for logging.

Figure 2A:
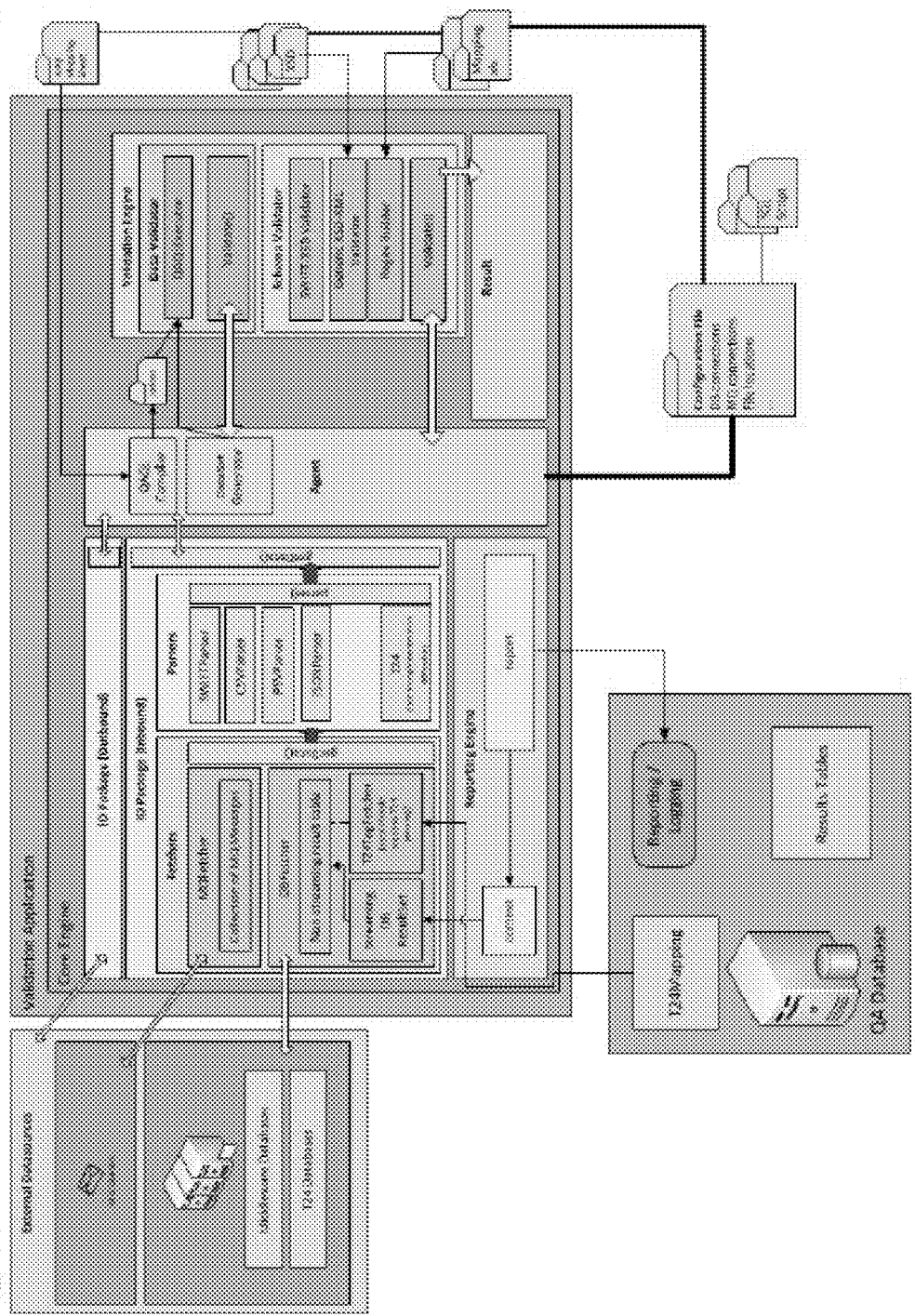
FIGS. 2A and 2B illustrate embodiments of the regressive testing system.

FIG. 2A illustrates one embodiment of the scalable enterprise system for automated functional and integration regression testing. The figure illustrates the operations of the validation application, and specifically the core engine (also known as the testing engine), which includes similar capabilities to those described above with reference to FIG. 1.

Figure 2B:
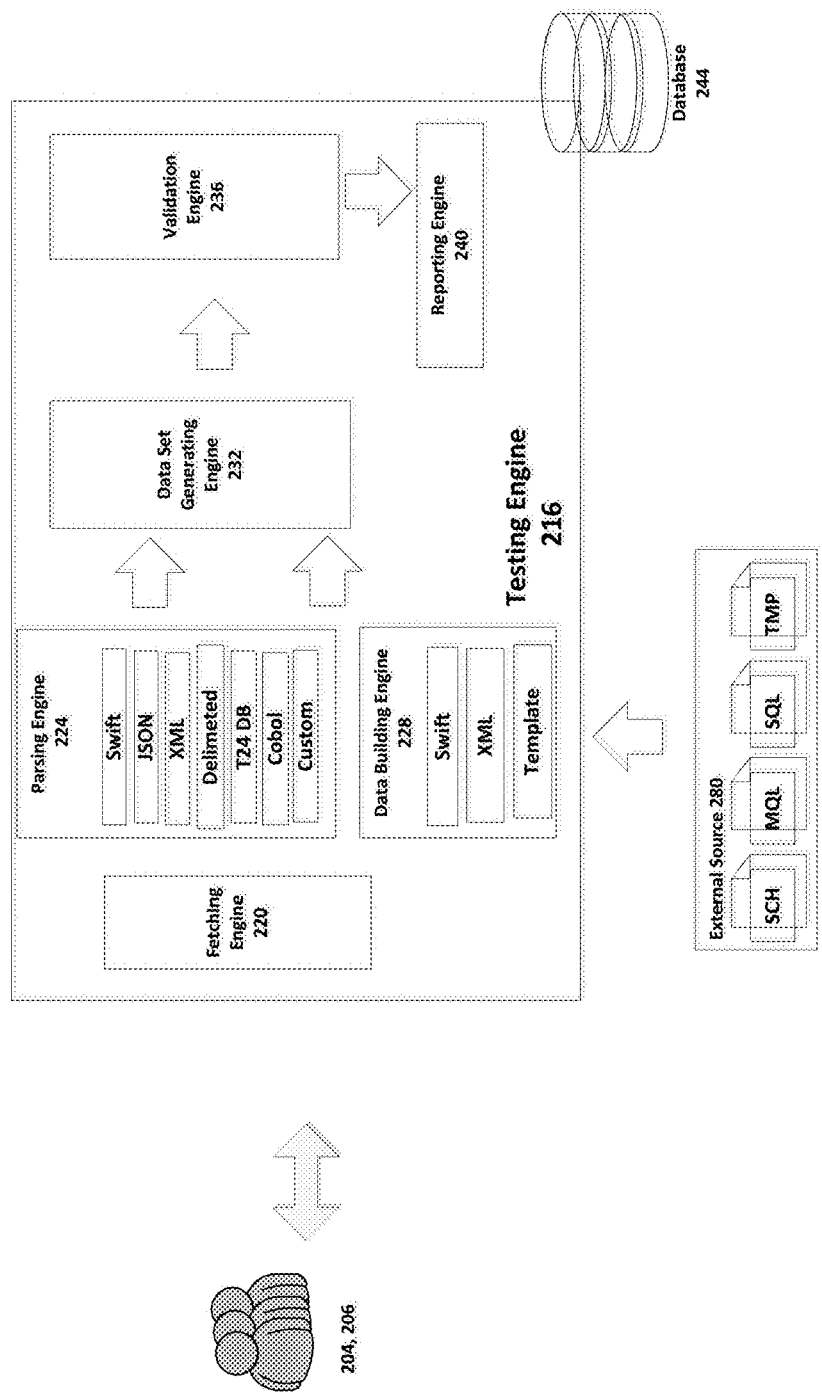

FIG. 2B illustrates another embodiment of a scalable enterprise system for automated functional and integration regression testing. The system 200 receives commands from user devices 204 and 206 and may transmit responses and other information to the user devices. The user devices may communicate with the system via a secure means such as HTTPS communications. In at least one embodiment, the embodiments depicted in FIG. 2B include components with at least the functionality as those described with respect to FIG. 1.

The system 200 includes one or more testing engine 216. The testing engine 216 includes a fetching engine 220, parsing engine 224, data building engine 228, data set generating engine 232, validation engine 236, and reporting engine 240. The testing engine 216 may have access to and/or may include a database 244, which may include results, including testing results, test metadata, test logging, and other reporting information.

The fetching engine 220 may be capable of collecting a message queue from a message queue source, such as external sources, including via various protocol known in the art, including Impala, Oracle, MQ, Filesystem, SFTP, and/or REST API. The fetching engine 220 may further support data streaming. The fetching engine 220 may further include a database fetching engine which may retrieve middleware and T24 databases from the external sources. In one embodiment, the engine is capable of mapping database tags. For instance, where the system retrieves a T24 database for parsing and processing, the fetching engine 220 may retrieve a T24 mapping information from the external source, thereby allowing the system to parse T24 databases.

The parsing engine 224 is capable of parsing different types of data, including data that rely upon various types of schemas, such as SWIFT, JSON, XML, Delimited, T24 DB, or Cobol. The parsing engine 224 may also parse data using a custom schema. In at least one embodiment, the parsing engine 224 may support and operate in response to parser application programming interface (API) commands to parse and translate data received at the parsing engine into a common data scheme for processing at the testing engine. In one embodiment, the parsing engine 224 may parse a database based on one more schemas or format of the data received at the engine 216.

The data building engine 228 is capable of building data from external sources using an external schema and template definition. In one embodiment, the data building engine 228 receives a configuration file that identifies the external sources (e.g., external sources 124 and 128) which may be databases and/or message queues, and/or contain other file location information used by the system to prepare for and perform regression testing. Data from external sources may be retrieved or streamed (e.g., via the fetching engine 220) via one or more communication methods, including via File Transfer Protocol (FTP), Server Message Block (SMB), Hypertext Transfer Protocol (HTTP), and others. For instance, the data building engine 228 may retrieve or stream a configuration file that identifies the location of data (e.g., the message queue, database(s), middleware databases and/or T24 databases (located at external source 124)); location of the T24 mapping (located at external source 128); and location of the schemas. Based on the information, the data building engine may retrieve and stream the data and build the data for testing by the testing engine 216. In one embodiment, the data retrieval and building is performed using one or more API. For example, the data building engine may cause the retrieval of the relevant schema and template definitions via an API command to an external source.

The data set generating engine 232 may be capable of generating the data that will be used for validation testing by the validating engine 236. The data set generating engine may further present data to the validation engine 236 for validation testing, including, but not limited to, a data set of the actual results and a data set of the expected result for validation. In at least one embodiment, the data sets are presented in a common data format. Data may further be presented to the validation engine in the form of data frames that the validation engine 326 may process. For example, the validation engine 236 may compare a data frame of the actual results of a test as compared with a corresponding data frame containing the expected results of a test.

The results of the validation tests may be forwarded to the reporting engine 240. In addition, the results may be stored at the reporting engine 240 and/or the database 244. In at least one embodiment, the validation engine 326 presents the results to the reporting engine 240 via a logging API command. The reporting engine 240 may also be capable of logging the results at a field-by-field level of granularity in order to facilitate fast and accurate identification of defects.

The system 200 may receive data and executable code from external sources, including external source 280. External source 280, for example, may include systems that may provide system 200 with contract schema definitions (SCH) and template definitions (TMP). External source 280 may further include systems that may provide system 200 with executable code, scripts, SQL query command and logic, and other types of code, program and logic, that, when executed or processed, allows the system 200 to query for and interpret data from external databases. For example, the external source 280 may contain modules that include mapping query language (MQL) modules and SQL/NOSQL Query modules integrated with MQL that is used for complex derivation. For example, the system will allow integration with document storage platforms like SharePoint and code repository platforms like SVN and Stash. As a result, mapping and MQL data may be stored at an externally managed version control system that the system can automatically stream the data from (e.g., via an API). In one embodiment, the testing engine utilizes architectural Logical Data Model (LDM) auto create MQL to facilitate direct acceptance from software design asset without having to manually create MQLs.

FIG. 3 illustrates a method for performing regression testing in accordance with one embodiment of the present invention. The method may be performed using regression system 100, although a person of ordinary skill in the art would recognize that the method may be performed with other embodiments of the regression system, as disclosed herein.

At 300, the method begins. The system receives a configuration file at 304. The configuration file may include configuration information for execution of the regression test, including the location of the message queue, the database, and the schema, amongst other information.

At 308, based on the configuration file, the system may automatically establish a connection with the external source that contains the message queue and the middleware or T24 databases.

At 312, the system fetches and parses the data from message queue, the database, or other types of data located at the external source. The system may parse the data based on the type of database and/or database schema that the data is formatted in. In this example, the database may be a SWIFT-based database.

At 316, which may be performed concurrently with step 312, the system further retrieves the corresponding schema information. For instance, the system retrieves a SWIFT schema (e.g., XSD schema file) that defines the schema of each message to be tested by the regression testing system.

At 320, the system's validation engine validates the schema based on the type of schema received. For example, the system may validate the SWIFT schema. The system may validate the schema to ensure that all elements of the schema are present in the file and that the file is accurate and otherwise complete. One advantage of the validation of the scheme is to ensure that the file is compliant with other systems.

At 322, the system may further translate the schema into an internal schema format and store the internal schema format within the database of the system for re-use in other projects. The system may further validate data received at the system.

At 324, the system generates an internal dataset for the regression testing. In one embodiment, the internal dataset is generated based on the data received from the external source and may also be based on the schema information received at 316. In one embodiment, the internal dataset is stored in at least one database and may be re-used in other projects.

At 326, the system retrieves mapping data from a mapping database for use in data validation. As described above, the mapping database is automatically generated and updated by the system to allow for the validation of data from two or more external sources. The use of the mapping database also allows for the transmission of the mapping database within one or more systems. In addition, in one embodiment, the system processes the mapping database and compiles the content of the mapping database to generate a data validation mapping module for execution by the system. The execution of the data validation mapping module causes a processor to automatically validate the content of the internal dataset from two or more external sources.

At 328, the system generates at least one executable regression testing module. For example, in one embodiment, the system generates an executable regression testing module based on the schema information and the generated dataset. The executable regression testing module may be generated and compiled using the regression testing module compiler of the system. The compiler may further link the internal dataset and other information with the generated testing module. In at least one additional embodiment, the system generates the executable regression testing module based also on the configuration file.

The regression testing module, when executed, at 332, by the validation engine, processes the dataset generated at step 324 and validates the data using a selected regression testing method.

At 336, the results are stored and transmitted to an external database.

Figure 4:
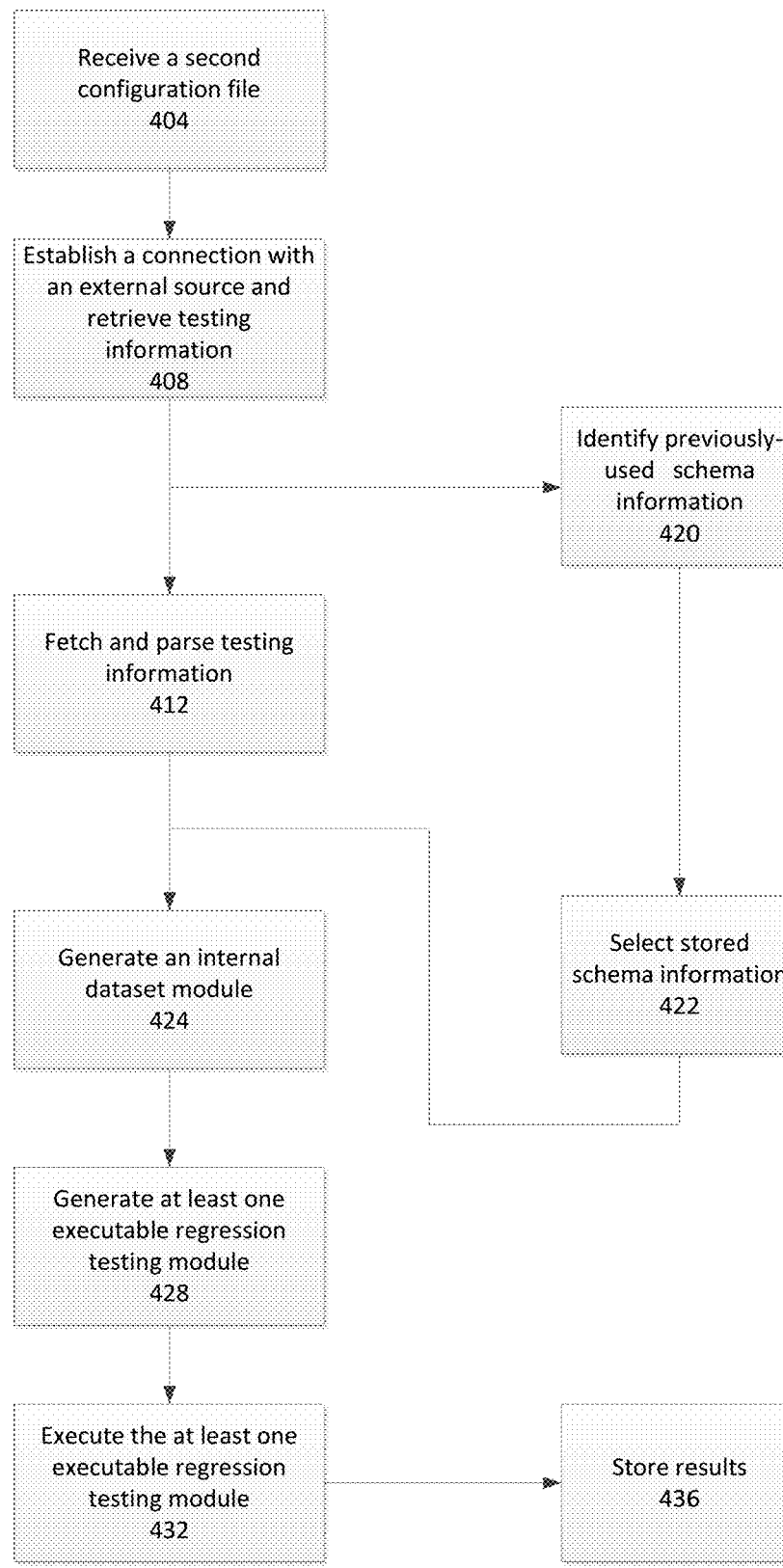
FIG. 4 provides a method of performing regression testing in accordance with an embodiment of the present invention.

FIG. 4 provides a method of performing regression testing in accordance with an embodiment of the present invention. Embodiments of the present invention, such as that provided in FIG. 4, allow for previously-processed schemas to be re-used across projects.

At 404, a regression testing system may receive a configuration file that identifies the same schema as that handled in the method of FIG. 3. At 408, based on the configuration file, the system may automatically establish a connection with the external source that contains the message queue and the middleware or T24 databases. The configuration file may include configuration information for execution of the regression test, including the location of the message queue, the database, and the schema, amongst other information. At 412, based on the configuration file, the system may automatically establish a connection with the external source that contains the message queue and the middleware or T24 databases. At 416, the system fetches and parses data from the message queue and/or the database located at the external source. The system may parse the data based on the type of database and/or database schema that the data is formatted in.

At 420, which may be performed concurrently with step 412, the system determines that the corresponding schema had been previously used for regression testing. At 422, the system selects the corresponding internal schema from the database.

At 424, the system generates an internal dataset for the regression testing. In one embodiment, the internal dataset is generated based on the data received from the external source and may also be based on the schema information stored internally.

At 426, the system retrieves mapping data from a mapping database for use in data validation. As described above, the mapping database is automatically generated and updated by the system to allow for the validation of data from two or more external sources. The system processes the mapping database and compiles the content of the mapping database to generate a data validation mapping module for execution by the system. The execution of the data validation mapping module causes a processor to automatically validate the content of the internal dataset from two or more external sources.

At 428, the system generates at least one executable regression testing module. In one embodiment, the system generates an executable regression testing module based on the previously stored schema information and the generated dataset. For example, the executable regression testing module may be generated and compiled using the regression testing module compiler of the system. The compiler may further link the internal dataset and other information with the generated testing module. In at least one additional embodiment, the system generates the executable regression testing based also on the configuration file. At 436, the results are stored and transmitted to an external database.

Figure 5:
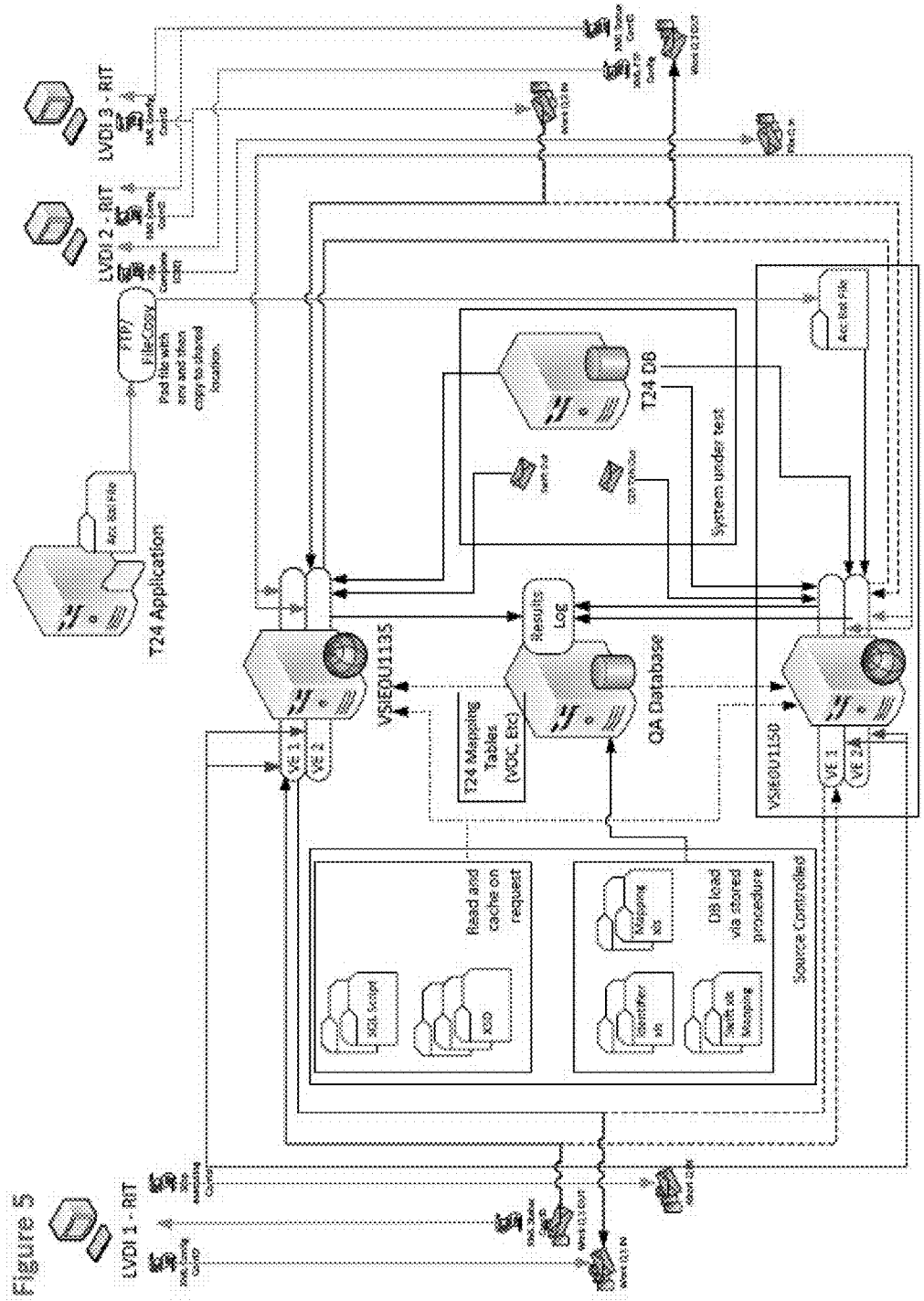
FIG. 5 provides an illustration of the dataflow amongst the components of the regression testing system in accordance with an embodiment of the present invention.

FIG. 5 provides an illustration of the dataflow amongst the components of the regression testing system in accordance with an embodiment of the present invention. The figure, for example, illustrates the flow of an XML configuration file from device LVDI 1 that allows the message queue (WORK Q.1 IN) to be retrieved and which is validated by the Validation Engine, VE 1. The validation engines, VE 1 and VE 2, each may utilize XSD schemas, SQL scripts, mapping and identifier information to validate the messages of the message queue.

Embodiments of the present invention also provide resilience capabilities that can auto-recover from system test failure. Whereas prior art systems must execute an entire testing cycle again in the event of a system failure, embodiments of the presently disclosed invention may automatically recover with the last-tested message being validated.

Figure 6:
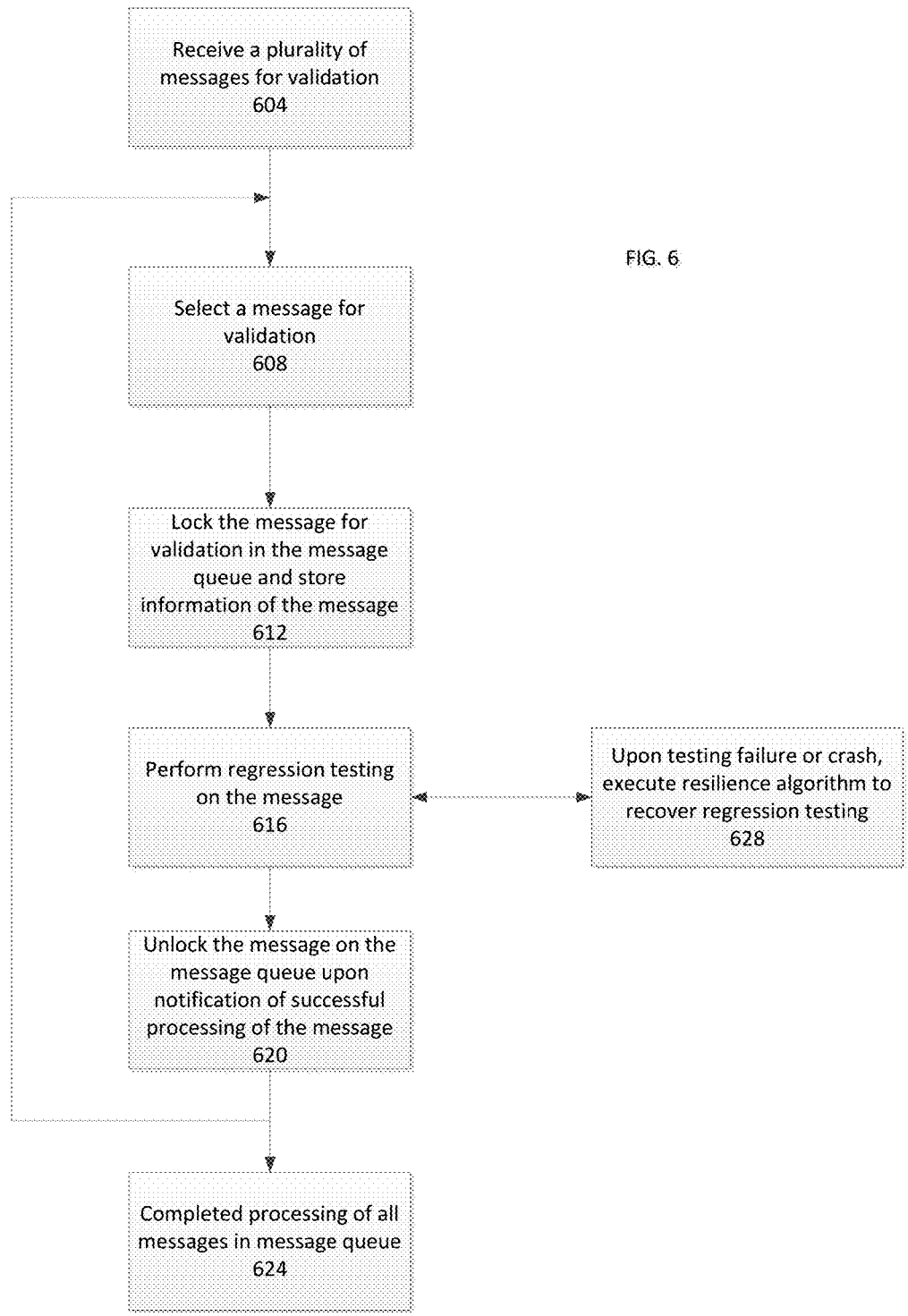
FIG. 6 depicts a method of providing resilience capabilities during regression testing.

FIG. 6 depicts a method of providing resilience capabilities during regression testing. At 604, the testing begins and the system receives a plurality of messages for validation in the testing queue. At 608, the system selects a first message for validation on the system. At 612, the first message is locked on the queue, with the system storing information identifying the message within the queue. The message may not be removed from the queue at this step. At 616, the message is processed, the results are validated. At Step 620, the results are written in a database. The system continues to lock the first message on the queue. Only upon the completion of step 620 is the first message unlocked from the queue and removed from the queue. The process repeats with the next message in the queue, until, at 624, there are no more messages in the queue for testing. If the regression testing were to crash during testing, the system automatically performs step 628, executing a resilience algorithm that includes recovering the system at the last-tested message. For example, in one embodiment, the system identifies the last locked message in the message queue and resumes the regression testing at this portion of the message queue.

Embodiments of the present invention support secured separation of testing domains. The system may support domain segregation and may bind the data to one or more user groups. A single instance of the platform may be deployable for the whole enterprise. Additional security may be provided using private and public keys with token based authentication. The system can also authenticate and authorize users via a third-party identity management system using security protocols, such as Kerberos, LDAP, OAuth, etc. Entitlements may also be managed via standard domain user management tools. In at least one embodiment, the system includes a centralized user interface system that provides users with different domains to securely access one or more testing domains.

Figure 7:
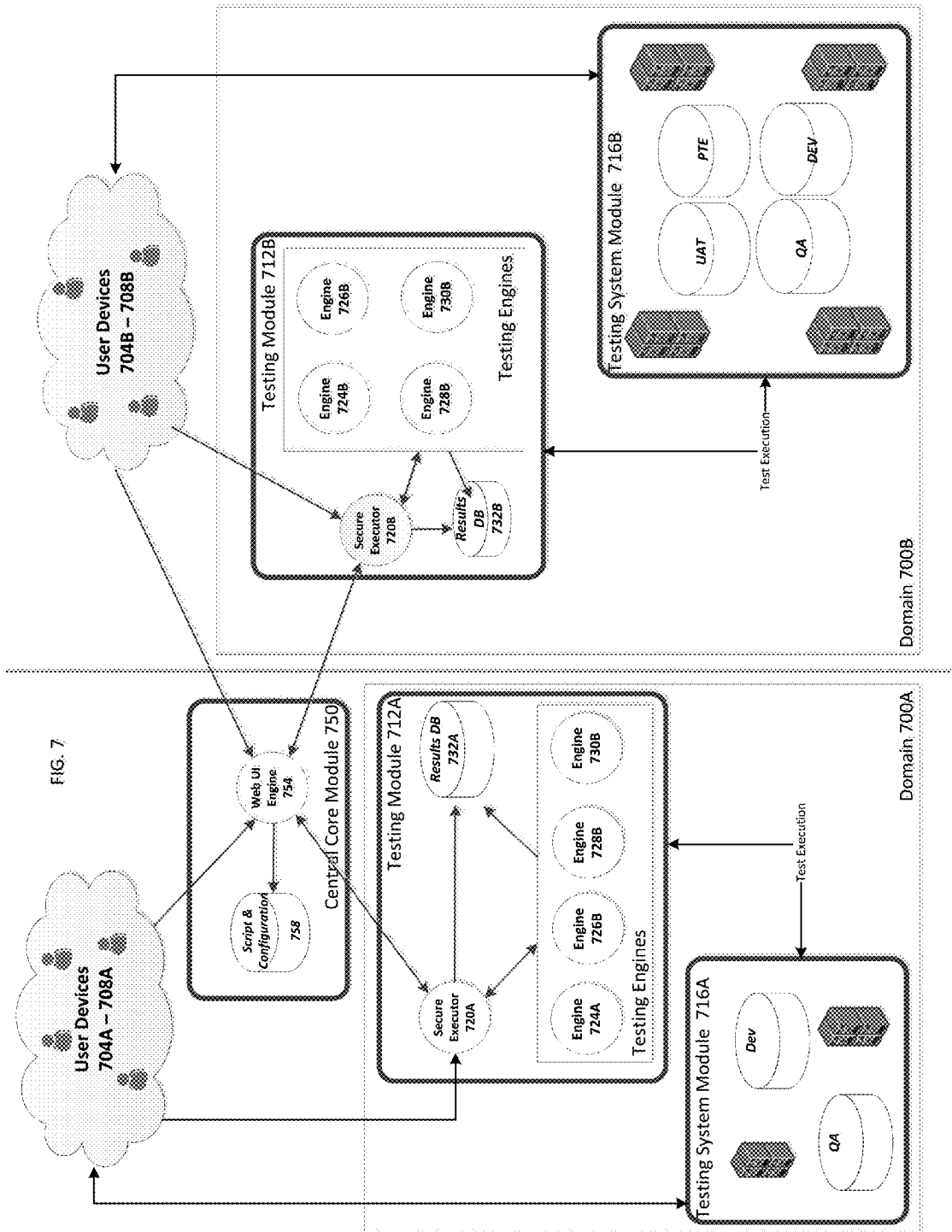
FIG. 7 depicts a system architecture diagram in accordance with one embodiment of the present invention.

FIG. 7 illustrates one embodiment of the present invention that supports secured separation of testing domains and which allows user devices performing tests to access the devices' respective domains to execute tests, to analyze results, and to perform other functions. FIG. 7 illustrates a system that supports a domain 700A and a domain 700B, though a person of ordinary skill in the art would recognize that the system may support additional domains. Domain 700A includes user devices 704A-708A, testing module 712A and testing system module 716A. Testing module 712A may include a secure executor 720A, an engine pool that includes testing engines 724A, 726A, 728A, and 730A, and results database 732A. Domain 700B includes user devices 704B-708B, testing module 712B and testing system 716B. Testing module 712B may include a secure executor 720B, an engine pool that includes testing engines 724B, 726B, 728B, and 730B, and results database 732B. While the systems, engines and other components are associated with their respective domain, these systems, engines, and components of the domains need not be located on different physical systems, servers, sets of systems, or physical location. Rather, in at least one embodiment, the use of domains allows for these systems, engines, and components to operate on the same server or sets of servers. For example, the testing module 712A, testing system module 716A may operate on the same server as the testing module 712B, testing system module 716B.

In addition, in at least one embodiment, some or all of the components disclosed above need not be located physically near one another, even systems and modules that are part of the same domain. Rather, modules and systems may be located anywhere, allowing for these components to be stored and run from the cloud, for example. Because the engine could be running in the cloud, the engines may automatically perform a 'pre-flight checks' to identify the engine (which could be anywhere in the world) with the lowest latency with system under test and choose that one for test execution. This functionality may be utilized when testing a large distributed system.

As depicted in FIG. 7, the system further includes a central UI module 750 that includes at least a web UI engine 754 and a scripts and configurations database 758. While the central UI module 750 is depicted as part of Domain A, it need not be associated with any one domain and may be associated with multiple domains. In at least one embodiment, the system may include multiple central UI modules.

In one embodiment, the central UI module 750 is accessible by user devices from any domain, including user devices 704A-708A and user devices 704B-708B. The user devices may access a web user interface (UI) generated by the web UI engine 754 by way of a web browser located on the user device or other applications. Using the web UI, the user devices may select, configure and execute testing and receive and analyze results, as discussed herein, using the engines, scripts, and configurations available for the user device's associated domain. For example, a user device 704A may utilize the web UI engine 754 to initialize the secure executor 720A to execute one or more tests using one or more testing engines 724A, 726A, 728A, and 730A. The results are stored in results database 732A accessible by the user device 704A. Similarly, a user device 708B may utilize the web UI engine 754 to initialize the secure executor 720B to execute one or more tests using one or more testing engines 724B, 726B, 728B, and 730B. The results are stored in results database 732B accessible by the user device 708B. User devices from domain A, however, may not access any of the secure executor, engines, databases, or systems of other domains (e.g., domain B), and similarly, user devices from domain B, however, may not access any of the secure executor, engines, databases, or systems of any other domains (e.g., domain A). In this manner, data, scripts, testing engines, and other components and information of a given domain are kept secure, even between domains running on the same system.

Embodiments of the present invention allow for the automatic generation of management testing reports. For example, the central UI module 750 may include a reporting engine that automatically aggregates testing results in real-time or for a given period. In one embodiment, the report may include data from multiple domains. For example, the report may provide a manager with real-time understanding of the percentage of regression tests a given domain has executed in the last seven days and the results of such tests. Unlike other reports that prior art systems provide, embodiments of the present invention generate reports that provide granular, field level detail of the tests conducted and the results.

The central UI module 750 provides a centralized access point in which users across domains may access a consistent and common user interfaces to configure and execute tests and to access and analyze testing results. Thus, the central UI module 750 may allow for fast and accurate customization of user interfaces for user devices across domains. In at least one embodiment, how testing reports are generated and displayed are customizable across domains, thereby allowing for fast and consistent deployment of reports across one or more domains. At the same time, the use of separate domains for each system allows for multiple testing domains to be maintained independent of physical locations of the engine, systems, and database contained therein, thereby providing deployment flexibility and lowered costs.

In another embodiment, the system includes an infrastructure feedback module (not depicted) that provides real-time infrastructure feedback to user devices via the web UI engine 754. The infrastructure feedback provides the user devices not only with the testing results (e.g., failures), but also data regarding the performance of the server(s) operating the tests. This allows users operating the tests to recognize when the results may be caused or effected by constraints of the computer servers executing the tests, rather than issues arising from the tests themselves. For example, the user devices may receive real-time information of the servers indicating that the servers are experiencing low memory because the server is executing too many concurrent tests or maintaining too many testing engines.

Figure 8:
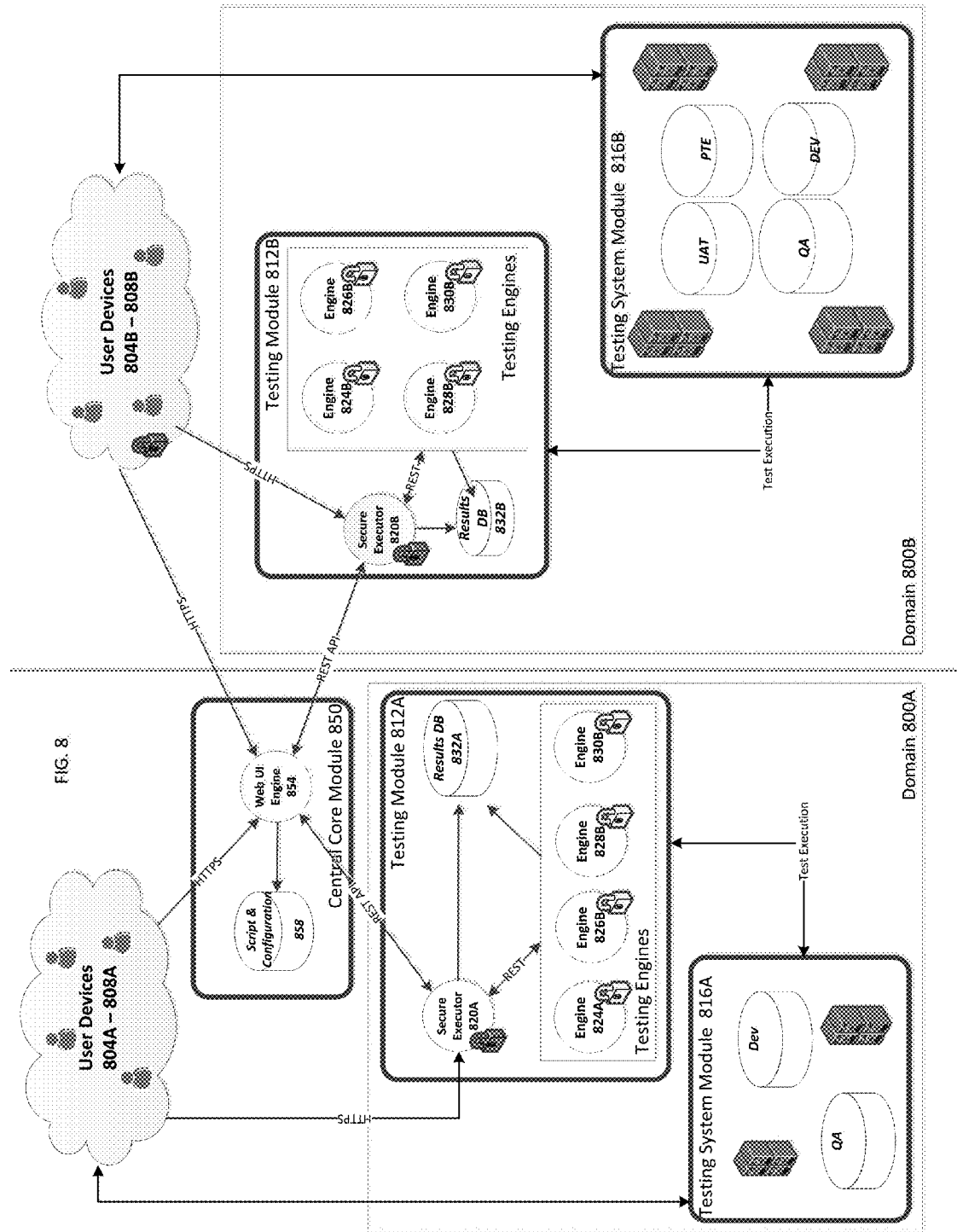
FIG. 8 depicts another system architecture diagram in accordance with one embodiment of the present invention.

In at least one embodiment of the present invention, the system supports not only testing of systems in separate domains, but the system allows for secured communications and prevents interception of data, such as from so-called man in the middle attacks, in which communications between user devices and another system over a communication network are intercepted and the data therein compromised. To provide further security, embodiments of the present invention allow for secured communication between the user devices, modules and testing systems. In addition, data and functions contained in the various modules described herein may be locked, such as via encryption and/or passwords. For example, FIG. 8 illustrates a system similar to that provided in FIG. 7. However, in the system illustrated in FIG. 8, the communications are secure and data are encrypted using managed keys. As depicted in FIG. 8, for example, communications between the user devices and the central UI module 850 are secured using, in this example, Hyper Text Transfer Protocol Secure (HTTPS) communications, although other forms of secured communications may be utilized. Furthermore, communications between the user devices and the testing modules are similarly secured. In addition, to secure communications data stored in any of the components of the system may further be secured from access, such as through encryption of the data. For example, data stored at the secure executors may be encrypted as well as the testing engines. In addition, functions may be locked and inaccessible without a password or other authentication methods. In at least one embodiment, the encryption key and/or method used to secure each of the testing engines and/or the secure executor may differ.

In at least one embodiment, the system further secures data and communications by requiring the use of tokens or other similar datum for one or more of the user device requests. For example, in order for a user device 804A to request the execution of a test by testing engine 824A, the user device must first submit the request via HTTPS to the web UI engine 854. Prior to or in response to such a request, the web UI engine 854 may require the user device to provide credentials so as to authenticate the user and the user's request. This may include, for example, receiving and verifying the username and password. Furthermore, it may include validating that the user is authorized to perform the request by comparing the username against a database (stored at any of the depicted modules or elsewhere in the system) that includes information describing the rights of each username, user device, groups, or domains. For example, components of the central UI module 850 may verify that the user is authorized to run a test using testing engine 824A. The system can also authenticate and authorize user via a third-party identity management systems using security protocols. Authorization could also be done via a third-party entitlement provider, which may be done in real-time. Upon authentication, the central UI module 850 may generate a token, which may be used to identify the user device with the secure executor 820A. In at least one embodiment, a new token must be generated for each request by the user device. In another embodiment, a new token may be generated after a certain predetermined period of time, such as every hour.

The user device 804A may retransmit its request to secure executor 820A to perform the requested test, and this request may include the token. In one embodiment, the token may include an execution ID and other information that identifies the user and/or the requests. In response, the secure executor 820A may verify and validate the user request and the token with the central UI module 850. This communication may be performed automatically via an application programming interface protocol, such as REST API. However, other protocols may be utilized. Other information and controls may be provided between the secure executor 820A and the central UI module 850 in a secure manner, including scripts, mapping, and other information discussed herein that may facilitate the execution of the tests. If the authentication is successful, the secure executor 820A may transmit a command (e.g., via REST API) to the testing engine 824A to perform the requested test. The testing engine 824A, upon verifying the authenticity of the request, may unlock the testing engine 824A, including the data therein, and execute the requested test. In at least one embodiment, the communications from the secure executor to the engines are encrypted using public key cryptography, or asymmetrical cryptography system. For instance, the engines may perform a token validation process with the secure executor 820A prior to decrypting the data stored with the testing engine and that are required for testing. Upon verification and decryption, the tests may be executed. For example, variables that are to be used in the validation tests may be substituted into a script (which may be received from the secure executor or stored at the engine) for each of the items in a decrypted map and the testing engines execute the test scripts.

Testing results may be stored at the results database 832A and accessible by the user device 804A through a request. The testing results may be communicated back to the user device. In at least one embodiment, the testing results may also be encrypted using a public key cryptography, or asymmetrical cryptography system such that only the user device with the password and/or private key may decrypt the data.

In at least one embodiment, data from the testing engine may be directly streamed to the user device and may be streamed in a securely, bypassing web UI engine. The data streamed may be encrypted and/or password protected. Only the user device with the password and/or private key to the data may decrypt the data.

The regression testing system discussed herein may further support test suites, which may contain a plurality of executable test scripts. In one embodiment, the scripts are stored as part of the central UI module. User devices therefore may upload or modify the scripts stored at the central UI for execution by the testing engines. These scripts may run on several different testing engines of a domain in parallel. The scripts themselves may have variables that are common to the context of the test suite execution, such as company specific details. The scripts may be stored at database 858.

In one embodiment, the secure executor 812 may perform password decryption and configure the pre-execution options of the testing engines. The system may support execution of an auxiliary script to the test suite, which, when executed, causes the system to look up company information under a test data base using a supplied identifier. In one embodiment, in response to a request to execute the script and run a test, the central core module 850 will perform a pre-execution process with the secure executor 820A. The central core module 850 may communicate a script and a token to the secure executor 820A for execution, along with the username and password for a system under test linked to Domain 800A. The password is encrypted asymmetrically using the public key from the domain when it is stored at the central core module 850. The secure executor 820A may then validate the token by communicating with the central core module 850, and if the token is validated, the secure executor 820 may decrypt the password using its private key. Using the username, password and connection details, the secure executor 820A may execute the script on the environment to populate the map of variable name to value mapping. The secure executor 820A may also encrypt the entire map symmetrically using a randomly generated password that is then encrypted using the public key. The encrypted information may be sent back to the central core module 850, completing the preexecution cycle. The central core module 850 may package the encrypted map with each of the scripts in a test suite, along with any encrypted connection detail and provide the package to the secure executor 820A for execution of the script on one or more of the testing engines. The engines may perform a token validation process with the secure executor 820A prior to decrypting the data stored with the testing engine and that are required for testing. Upon verification and decryption, the variables are substituted into the script for each of the items in the decrypted map and the test scripts are executed by the testing engines.

Figure 9:
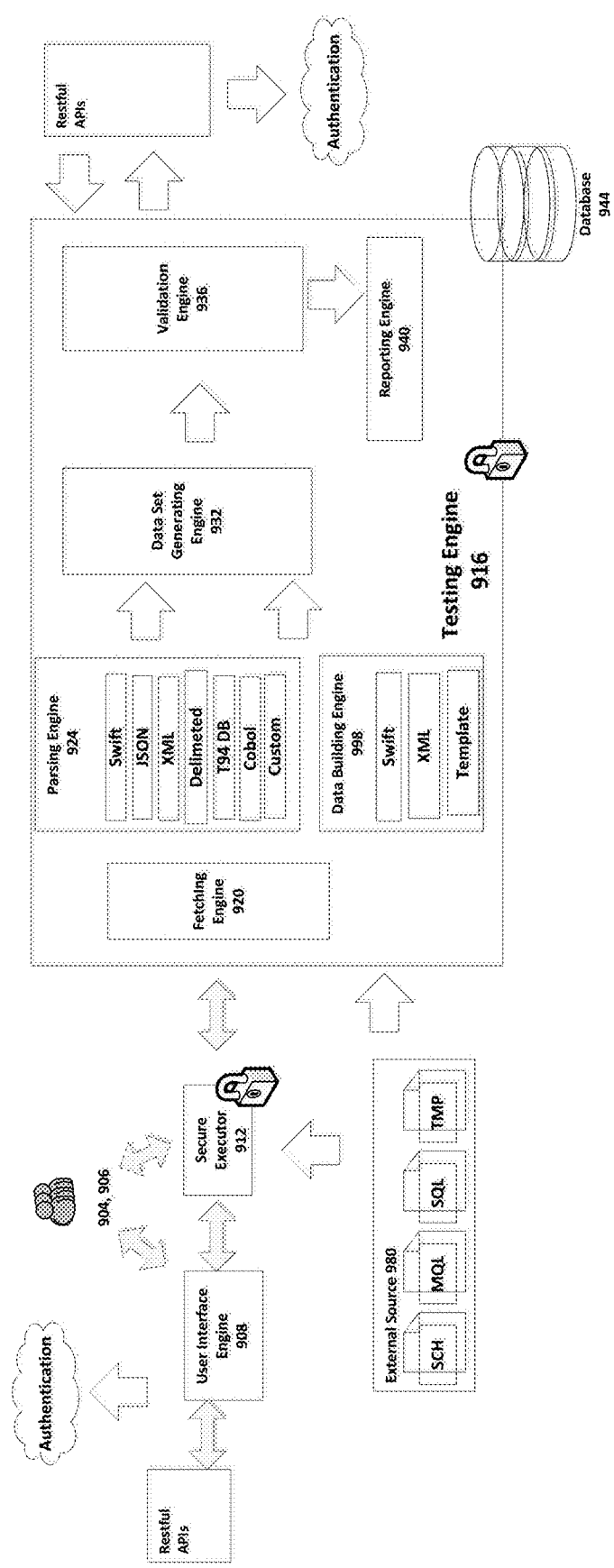
FIG. 9 depicts yet another system architecture diagram in accordance with one embodiment of the present invention.

FIG. 9 illustrates another embodiment of a scalable enterprise system for automated functional and integration regression testing. The system 900 receives commands from user devices 904 and 906 and may transmit responses and other information to the user devices. The system 900 includes one or more user interface engine 908, one or more secure executor 912, and one or more testing engine 916. The testing engine 916 may include a fetching engine 920, parsing engine 924, data building engine 928, data set generating engine 932, validation engine 236, reporting engine 940. The testing engine 916 may have access to and/or may include a database 944, which may include results of the testing, including testing results, test metadata, test logging, and other reporting information. In at least one embodiment, the embodiments depicted in FIG. 9's components include at least the functionality as those described with respect to FIG. 2B. As one example, testing engine 916 and database 944 may have at least the functionality of those described herein with reference to testing engine 216 and database 244 of FIG. 2B.

In one embodiment, the testing engine 916, the secure executor 912, and the user interface engine 908 may utilize stateless load balancing, is horizontally scalable and is self-healing. As one example of the system's capability for self-healing, if the system own workflow or configuration database crashes, the systems hold onto their current state waiting for the database to return and, once back on line, the system is able to continue the test execution and processing where the tests were interrupted without user impact or interaction. On failure of an engine, a pending test may also be re-routed to another engine real-time. Thus, the system actively monitors and assesses system status to detect failure and take appropriate action to self-heal and restore service to the user.

User devices 904 and 906 may communicate with the user interface engine 908, including, for example, to provide commands and perform other functions described herein. For example, the user device 904 may command the user interface engine 908 to define test suites, scripts, initiate execution, and to access reporting and environment management options.

The secure executor 912 allows for the user devices to access, and command the execution of tests by one or more testing engines (e.g., testing engine 916) and to retrieve and analyze testing results. The secure executor 912 may further perform and tests domain segregation by ensuring that the user device is associated with an acceptable domain.

In at least one embodiment, data from the testing engine may be directly streamed to the user device, bypassing the user interface engine 908. In addition, the data streamed may be encrypted and/or password protected. Only the user device with the password and/or private key to the data may decrypt the data. In addition, as described with respect to other embodiments, embodiments of the system 900 may provide additional security by utilizing asymmetric encryption and tokens-based request validation. As depicted, the system's various engines, executors and devices support the use of Restful APIs or other protocols to authenticate communications from other engines, executors, and devices. For example, the engines may authenticate communications, including commands, using Restful APIs before decrypting data stored at a given engine and before proceeding with any test execution.

In embodiments of the present invention, the scalable enterprise system for automated functional and integration regression testing provides for high inheritance and low maintenance. For example, embodiments of system supports externalised acceptance definitions in the form of schema contracts and mapping language. Thus, unlike the prior art, the system has the capability to take a design artefact and use the artefact directly to validate the system under test without any manual intervention from tester or developer. Furthermore, unlike the prior art, the system has the capability to build design artefacts from the discovery of the system under test. These features may further facilitate design driven testing.

Embodiments the scalable enterprise system for automated functional and integration regression testing further include the capability to automatically generate data to exercise coverage of the system under testing. For example, embodiments of the system include machine learning engines and may utilize machine learning algorithms to discover the system flows and generate the data and mapping sheets. The system may further mutate data to generate negative test coverage automatically and generate test data through algorithms that interpret the schema definition and mapping design artefacts. Embodiments the scalable enterprise system for automated functional and integration regression testing further include the capability to identify missing coverage through analysis of discovered data and the structured data that was generated via the interpretation of the design artefacts.

In addition, embodiments the scalable enterprise system for automated functional and integration regression testing further support configurable lists of algorithms for test data generation, which can be applied at the schema field level by the user. The generated data may override the auto generated data conditions, for example.

Embodiments the scalable enterprise system for automated functional and integration regression testing also support predictive coverage, including the capability to identify when a condition will be met in a future run of the application. This may predictive identification of coverage that is only realised when a system event or function is linked to a date.

Embodiments further support crowd sourcing algorithmic engines (e.g., "bots") from various local and external systems to analyze events and generate data and testing for future state coverage. These "bots" may also utilise predictive analysis algorithms to predict events and subsequent effects it may have on system under test. The system may initiate tests to the system in order to cover the cases that may have not been covered during the first run as it may not have been in the acceptance criteria.

Embodiments the scalable enterprise system for automated functional and integration regression testing further support the ability to trigger exposure of test execution workflow via restful API, which may allow interoperability with external application and continuous integration build tools. This will also mean the platform may be used as a service by other applications. In at least one embodiment, the system supports a cloud storage adapter, which enables the validation scripts in the platform to run as a service in the cloud. In one embodiment, runtime result analysis will trigger alternative flows or respond via restful API to the calling system.

In yet another embodiment, the system supports trending analysis for regression runs to determine the deviation against previous test run population. The system may trigger notifications or events when configurable tolerances have been breached. The system may also determine what actions to take as a result, including when to deepen or enrich the coverage being executed based on system feedback.

Those skilled in the art will appreciate that the invention may be practiced with various computer system configurations, including hand-held wireless devices such as mobile phones or PDAs, multiprocessor systems, microprocessor-based or programmable consumer electronics, minicomputers, mainframe computers, and the like. The invention may also be practiced in distributed computing environments where tasks are performed by remote processing devices that are linked through a communications network, which may, for example, be or include a wireless network. In a distributed computing environment, program modules may be located in both local and remote computer storage media including memory storage devices.

The computer system may include a general purpose computing device in the form of a computer including a processing unit, a system memory, and a system bus that couples various system components including the system memory to the processing unit.

Computers typically include a variety of computer readable media that can form part of the system memory and be read by the processing unit. By way of example, and not limitation, computer readable media may comprise computer storage media and communication media. The system memory may include computer storage media in the form of volatile and/or nonvolatile memory such as read only memory (ROM) and random access memory (RAM). A basic input/output system (BIOS), containing the basic routines that help to transfer information between elements, such as during start-up, is typically stored in ROM. RAM typically contains data and/or program modules that are immediately accessible to and/or presently being operated on by a processing unit. The data or program modules may include an operating system, application programs, other program modules, and program data. The operating system may be or include a variety of operating systems such as Microsoft Windows® operating system, the Unix operating system, the Linux operating system, the Xenix operating system, the IBM AIX™ operating system, the Hewlett Packard UX™ operating system, the Novell Netware™ operating system, the Sun Microsystems Solaris™ operating system, the OS/2™ operating system, the BeOS™ operating system, the Macintosh™® operating system, an OpenStep™ operating system or another operating system or platform.

At a minimum, the memory includes at least one set of instructions that is either permanently or temporarily stored. The processor executes the instructions that are stored in order to process data. The set of instructions may include various instructions that perform a particular task or tasks, such as those shown in the appended flowcharts. Such a set of instructions for performing a particular task may be characterized as a program, software program, software, engine, module, component, mechanism, or tool. The system may include a plurality of software processing modules stored in a memory as described above and executed on a processor in the manner described herein. The program modules may be in the form of any suitable programming language, which is converted to machine language or object code to allow the processor or processors to read the instructions. That is, written lines of programming code or source code, in a particular programming language, may be converted to machine language using a compiler, assembler, or interpreter. The machine language may be binary coded machine instructions specific to a particular computer.

Any suitable programming language may be used in accordance with the various embodiments of the invention. Illustratively, the programming language used may include assembly language, Ada, APL, Basic, C, C++, COBOL, dBase, Forth, FORTRAN, Java, Modula-2, Pascal, Prolog, REXX, and/or JavaScript for example. Further, it is not necessary that a single type of instruction or programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module may be used to encrypt data. Further, files or other data may be decrypted using a suitable decryption module.

The computing environment may also include other removable/nonremovable, volatile/nonvolatile computer storage media. For example, a hard disk drive may read or write to nonremovable, nonvolatile magnetic media. A magnetic disk drive may read from or write to a removable, nonvolatile magnetic disk, and an optical disk drive may read from or write to a removable, nonvolatile optical disk such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The storage media is typically connected to the system bus through a removable or non-removable memory interface.

The processing unit that executes commands and instructions may be a general purpose computer, but may utilize any of a wide variety of other technologies including a special purpose computer, a microcomputer, mini-computer, mainframe computer, programmed micro-processor, micro-controller, peripheral integrated circuit element, a CSIC (Customer Specific Integrated Circuit), ASIC (Application Specific Integrated Circuit), a logic circuit, a digital signal processor, a programmable logic device such as an FPGA (Field Programmable Gate Array), PLD (Programmable Logic Device), PLA (Programmable Logic Array), RFID processor, smart chip, or any other device or arrangement of devices that is capable of implementing the steps of the processes of the invention.

It should be appreciated that the processors and/or memories of the computer system need not be physically in the same location. Each of the processors and each of the memories used by the computer system may be in geographically distinct locations and be connected so as to communicate with each other in any suitable manner. Additionally, it is appreciated that each of the processors and/or memory may be composed of different physical pieces of equipment.

A user may enter commands and information into the computer through a user interface (UI) that includes input devices such as a keyboard and pointing device, commonly referred to as a mouse, trackball or touch pad. Other input devices may include a microphone, joystick, game pad, satellite dish, scanner, voice recognition device, keyboard, touch screen, toggle switch, pushbutton, or the like. These and other input devices are often connected to the processing unit through a user input interface that is coupled to the system bus, but may be connected by other interface and bus structures, such as a parallel port, game port or a universal serial bus (USB).

One or more monitors or display devices may also be connected to the system bus via an interface. In addition to display devices, computers may also include other peripheral output devices, which may be connected through an output peripheral interface. The computers implementing the invention may operate in a networked environment using logical connections to one or more remote computers, the remote computers typically including many or all of the elements described above.

Various networks may be implemented in accordance with embodiments of the invention, including a wired or wireless local area network (LAN) and a wide area network (WAN), wireless personal area network (PAN) and other types of networks. When used in a LAN networking environment, computers may be connected to the LAN through a network interface or adapter. When used in a WAN networking environment, computers typically include a modem or other communication mechanism. Modems may be internal or external, and may be connected to the system bus via the user-input interface, or other appropriate mechanism. Computers may be connected over the Internet, an Intranet, Extranet, Ethernet, or any other system that provides communications. Some suitable communications protocols may include TCP/IP, UDP, or OSI for example. For wireless communications, communications protocols may include Bluetooth, Zigbee, IrDa or other suitable protocol. Furthermore, components of the system may communicate through a combination of wired or wireless paths.

Although many other internal components of the computer are not shown, those of ordinary skill in the art will appreciate that such components and the interconnections are well known. Accordingly, additional details concerning the internal construction of the computer need not be disclosed in connection with the present invention.

While particular embodiments of the invention have been illustrated and described in detail herein, it should be understood that various changes and modifications might be made to the invention without departing from the scope and intent of the invention.

From the foregoing, it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

The invention claimed is:

1. A regression testing system for testing a plurality of messages, the regression testing system comprising:
    a non-transitory computer memory storing at least executable computer instructions;
    at least one computer processor executing the executable computer instructions that provides at least the following:
        receiving, at a common interface, a testing request from at least one user device associated with at least one domain;
        validating the testing request;
        generating a security token based on step of validating the testing request;
        receiving, at a secure executor associated with the at least one domain, a secured testing request, the request including the security token;
        based on the secured testing request, the at least one computer processor is automatically activated to perform at least the following:
            receiving regression testing configuration information over a communication channel;
            retrieving a message schema;
            retrieving messages corresponding to the message schema from at least one external source;
            translating the message schema to an internal message schema;
            generating an executable code module based on the internal message schema;
            storing the executable code module in the non-transitory computer memory;
            executing the executable code module to perform at least one regression test of the messages retrieved from the at least one external source;
            storing the results of the at least one regression testing at a second external source;
            encrypting at least a portion of the results; and
            communicating the encrypted at least a portion of the results to at least one user device.

2. The computer system of claim 1, wherein generating of the executable code module is further based on the regression testing configuration information.

3. The computer system of claim 1, wherein the schema is a SWIFT schema.

4. The computer system of claim 1, wherein the at least one computer processor further executing the executable computer instructions to perform the step of retrieving a database from the at least one external source based on the regression testing configuration information.

5. The computer system of claim 4, wherein the at least one computer processor further executing the executable computer instructions to perform the step of parsing the database based on the message schema.

6. The computer system of claim 1, wherein the at least one computer processor further executing the executable computer instructions to perform the steps of:
    receiving second regression testing configuration information over a communication channel;
    in response to receiving the second regression testing configuration information, the at least one computer processor is automatically activated to perform at least the following:
        selecting the internal message schema based on the second regression testing configuration information;
        retrieving, via the communication channel, messages corresponding to the internal message schema from at least one external source;
        generating a second executable code module based on the internal message schema;
        storing the executable code module in the non-transitory computer memory;
        executing the executable code module to perform at least one regression test of the messages retrieved from the at least one external source;
        storing the results of the at least one regression testing at a second external source.

7. The computer system of claim 1, wherein, in response to a system failure, the at least one processor performing resilience algorithm, wherein the resilience algorithm includes the steps of identifying the location in the message queue prior to the system failure, restoring the last-processed message for resumption of message processing, and resuming the regression testing based on the last-processed message within the message queue.

8. The computer system of claim 7, wherein, prior to processing a message in the message queue for regression testing, the system locks the message within the queue.

9. The computer system of claim 8, wherein the system unlocks the message in the message queue only upon successful completion of the regression testing of the message.

10. A method for performing regression testing using a regression testing system including non-transitory computer memory storing at least executable computer instructions and at least one computer processor executing the executable computer instructions, the method comprising the steps of:
   receiving, at a common interface, a testing request from at least one user device associated with at least one domain;
   validating the testing request;
   generating a security token based on step of validating the testing request;
   receiving, at a secure executor associated with the at least one domain, a secured testing request, the request including the security token;
   based on the secured testing request, the at least one computer processor is automatically activated to perform at least the following:
      receiving regression testing configuration information over a communication channel;
      retrieving a message schema;
      retrieving, via the communication channel, messages corresponding to the message schema from the at least one external source;
      translating the message schema to an internal message schema;
      generating an executable code module based on the internal message schema;
      storing the executable code module in the non-transitory computer memory;
      executing the executable code module to perform at least one regression test of the messages retrieved from the at least one external source;
      storing the results of the at least one regression testing at a second external source;
      encrypting at least a portion of the results; and
      communicating the encrypted at least a portion of the results to at least one user device.

11. The method of claim 10, wherein generating of the executable code module is further based on the regression testing configuration information.

12. The method of claim 10, wherein the schema is a SWIFT schema.

13. The method system of claim 10, further comprising retrieving a database from the at least one external source based on the regression testing configuration information.

14. The method of claim 13, further comprising parsing the database based on the message schema.

15. The method of claim 10, further comprising:
   receiving a second regression testing configuration information over a communication channel;
   in response to receiving the second regression testing configuration information, the at least one computer processor is automatically activated to perform at least the following:
      selecting the internal message schema based on the second regression testing configuration information;
      retrieving, via the communication channel, messages corresponding to the internal message schema from the at least one external source;
      generating an executable code module based on the internal message schema;
      storing the executable code module in the non-transitory computer memory;
      executing the executable code module to perform at least one regression test of the messages retrieved from the at least one external source;
      storing the results of the at least one regression testing at a second external source.

16. The method of claim 10, further comprising, in response to a system failure, identifying the location in the message queue prior to the system failure, restoring the last-processed message for resumption of message processing, and resuming the regression testing based on the last-processed message within the message queue.

17. The method of claim 16, further comprising locking the message within the queue prior to processing a message in the message queue for regression testing.

18. The method of claim 17, further comprising unlocking the message in the message queue only upon successful completion of the regression testing of the message.

* * * * *